Oct. 24, 1939.                S. S. STACK                2,177,502
ELECTRICAL DEVICE AND METHOD OF FABRICATING THE SAME
Filed March 19, 1937
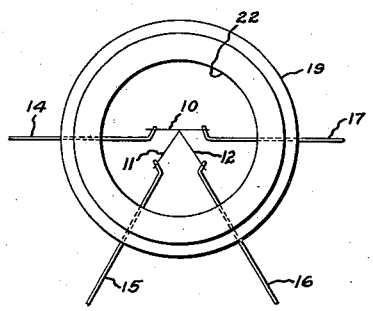
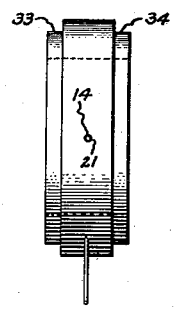
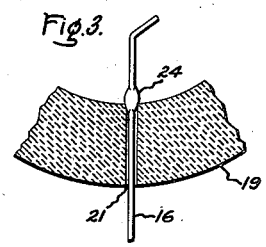
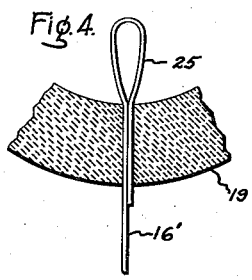
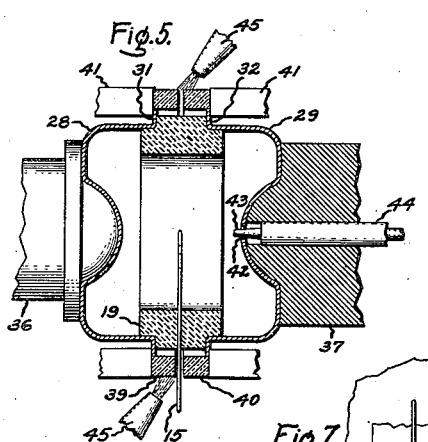
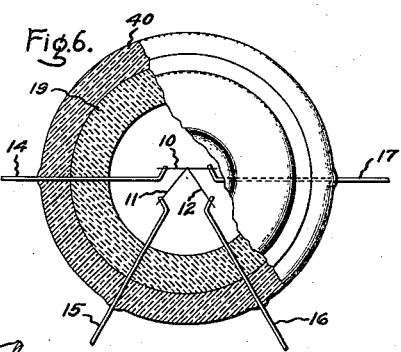
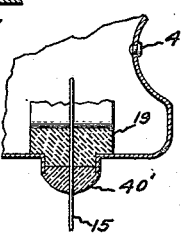
Inventor:
Sydney S. Stack,
by Harry E. Dunham
His Attorney.

Patented Oct. 24, 1939

2,177,502

UNITED STATES PATENT OFFICE 2,177,502

ELECTRICAL DEVICE AND METHOD OF FABRICATING THE SAME

Sydney S. Stack, Schenectady, N. Y., assignor to General Electric Company, a corporation of New York Application March 19, 1937, Serial No. 131,974

5 Claims. (Cl. 136—4)

The present invention relates to sealed electrical devices and is primarily concerned with devices which comprise enclosed energy converting elements and lead-in conductors connecting with the same.

It is an object hereof to provide in connection with such devices a structure which is more compact and which possesses substantially greater mechanical strength than those heretofore available.

It is a further object to provide a method of fabrication which results in less shrinkage (manufacturing loss) than the methods previously employed.

While not limited thereto the invention is particularly applicable to vacuum thermocouple devices for measuring alternating currents of high frequencies. These devices typically comprise a sealed and evacuated enclosure containing an electrical resistance heating element, and a thermocouple in heat responsive relation to the heating element. Other necessary elements include means for conducting the current to be measured to the heating element and for permitting measurement of the thermocouple response by a meter or other indicating device outside of the enclosure.

In accordance with one embodiment of the invention I provide in connection with a vacuum thermocouple an enclosing structure comprising a pair of opposed metal wall members and spacing means providing a central space between the wall members. Energy-converting elements comprising a heater and thermocouple are arranged within the open space and provided with lead-in conductors which extend outwardly from between the metal wall members. The structure is sealed by a quantity of thermoplastic material, such as glass, disposed circumferentially between the wall members and hermetically joined to the wall members and to the conductors. As will be pointed out more fully hereinafter the conductors connecting with the enclosed heating element are so arranged that the electrostatic capacity between them does not interfere with the accuracy of the measurements taken by means of the device.

The features of novelty which I desire to protect herein are pointed out with particularity in the appended claims.

The invention itself, together with further objects and advantages thereof, will best be understood by reference to the following description taken in connection with the accompanying drawing, in which Fig. 1 is a plan view showing certain of the elements of my improved measuring device in a preliminary stage of assembly; Fig. 2 is another view of the same elements taken at an angle 90 degrees displaced from the view of Fig. 1; Figs. 3 and 4 are fragmentary views in section showing alternative ways of supporting the lead-in conductors; Fig. 5 is a view in section showing the assembled parts of the device during an intermediate stage of fabrication; Fig. 6 is a view in partial section of a completed device, and Fig. 7 is a sectional fragmentary view of the completed device, the section being taken in the same plane as that of Fig. 5.

Referring particularly to Fig. 1, I have illustrated a current-measuring device comprising a resistance wire or heater 10, for example of carbon, and a thermocouple of known type arranged in heat responsive relation thereto. The thermocouple is shown as including dissimilar wires 11 and 12, such wires being positioned to form a V whose apex rests against the heater wire where it may be secured by the use of a suitable binder, for example, a colloidal suspension of graphite in water. The wires 11 and 12 are of small diameter, preferably less than 0.001 inch and may consist, for example, of a nickel-chromium alloy in the one case and a nickel-copper alloy in the other.

Heating of the wire 10 by the passage of current therethrough will cause voltages to be developed between the ends of the thermocouple wires in a well-known manner. These elements in combination thus constitute means for converting the energy of alternating current passing through the wire 10 into a continuous potential which can be conveniently measured.

Due to the extreme fragility of the elements described above, it is difficult to assemble and support them in such a fashion that they will be adequately protected during fabrication of the complete measuring device. It is not uncommonly true with the prior constructions of which I am aware that rejections may run extremely high due to breakage of the energy converting elements during the manufacturing process. In accordance with the present invention manufacturing shrinkage is reduced to a very low figure by the improved construction and method of fabrication to be described in the following:

It will be noted in the drawing that the wires 10, 11 and 12 connect with and are supported by conductors 14 to 17 inclusive. In the actual process of assembly these conductors are first supported in a spacing or insulating member 19. This member, which is in the form of an annular disk, may suitably comprise a ceramic material, for example, a vitrified composition comprising about 75 to 85 per cent of magnesia and a complementary proportion of clay. It is provided with laterally extending holes 21 to permit the conductors to project outwardly therethrough, and with a central opening 22 to receive the energy converting elements.

In Figs. 3 and 4 I have illustrated alternative means by which the conductors may be secured in place in the insulator. In Fig. 3, for example, the conductor 16 may be provided at a predetermined distance from its inner end with a flattened portion 24 of such nature as to wedge in the hole 21 when tension is placed on the conductor in a direction to draw it outwardly through the insulator. In Fig. 4 a similar result is obtained by providing a conductor 16' with a reverse bend whereby both its ends are caused to pass through the hole in the insulating member. A loop 25 serves as a convenient mounting for one end of one of the energy converting elements and, at the same time, provides enough wedging action to hold the conductor in place in the insulating member.

After the various conductors are inserted and properly oriented, the energy converting elements, that is, the wires 10, 11 and 12 may be secured to them as by welding or securing with a suitable binder. The temporary assembly thus formed is of such nature as to be conveniently handled during subsequent manufacturing processes and furnishes substantial protection to the mounted elements.

In using the device for measuring purposes it is desirable that the parts be enclosed in a substantial vacuum or in an inert gas in order to reduce heat loss and to prevent oxidation of the operative elements. Accordingly, my invention further provides a compact, mechanically strong and gas-tight enclosing structure, the nature of which may best be understood by reference to Figs. 5, 6 and 7. In order to enclose the space provided by the central opening 22 in the insulated member 19, there is provided a pair of opposed wall members, preferably of metal positioned on opposite sides of the insulating member 19. These members may be of various materials and may suitably comprise an iron-chromium alloy, a very satisfactory composition being one in which the chromium forms from 26 to 30 per cent of the alloy. They may also assume various shapes and are illustrated by way of example as comprising dished metal receptacles 28 and 29 provided with outwardly extending flanges 31 and 32 abutting against shoulders 33 and 34 provided for that purpose on the insulator 19. The outwardly extending edges of the wall members 28 and 29 face one another in juxtaposed relation but are spaced by the thickness of the member 19. In the assembly shown in Fig. 5 the various lead-in conductors extend outwardly from between the metal wall members.

In order to seal the enclosure thus formed the metal wall members may be supported between rotatable chucks 36 and 37 forming part of a fabricating machine. In order to complete the closure a quantity of thermoplastic material, for example, glass, is positioned around the external periphery by the annular insulating member 19. A particular material which has been found to be satisfactory for this purpose comprises a commercial lead glass containing about 20 per cent PbO and having a coefficient of thermal expansion of about $90 \times 10^{-7}$ centimeters per centimeter per degree centigrade. Such material is preferably provided in the form of a pair of preformed closed rings 39 and 40 positioned on opposite sides of the outwardly projecting conductors exemplified by the conductor 15. These rings may be held in the desired position by suitable followers 41 provided for that purpose. In order to cause the thermoplastic material to be drawn into sealing contact with the various parts, it is simultaneously subjected to heat and suction in accordance with the method described and claimed generally in application Serial No. 111,828, filed November 20, 1936, in the name of John H. Payne.

Pursuant to this method the enclosure may be preliminarily flushed by the introduction of hydrogen gas through a hollow nozzle 43 projecting inwardly through an orifice 42 formed for that purpose in the wall member 29. Thereafter the enclosure may be evacuated and suction applied in the desired manner through a conduit 44 arranged concentrically around the nozzle 43 and connecting externally with a vacuum system. If this suction is properly maintained while the rings 39 and 40 are fused to plastic condition by the application of heat from torches 45, the material will be caused to flow in such a way as to come into sealing contact with the outwardly projecting conductors and with the wall members 28 and 29.

The appearance of the completed seal is illustrated in Fig. 7 where it is seen that the surface tension of the thermoplastic material has caused it to assume the form of a narrow rounded fillet 40' and to adhere closely to the outer periphery of the insulating member 19.

In completing the device it may be highly evacuated by baking in a vacuum with the orifice 42 still unclosed. This orifice may as a final step be sealed by welding in a fusible element 47, for example, in accordance with the method described in application, Serial No. 112,884, filed November 27, 1936, in the name of John H. Payne. I prefer in any case that the sealing operation take place while the device as a whole is immersed in vacuum and is maintained at a high bake-out temperature.

Devices constructed in accordance with the foregoing procedure are extremely sturdy and are so compact as to permit the incorporation of the device as a whole within the casing of a small indicating instrument such as a milliammeter. Furthermore, the illustrated arrangement of lead-in connections in which the connections 14 and 17 are in rectilinear alinement is particularly advantageous from the standpoint of reducing the capacitance between them. As a result of this construction, inaccuracies due to capacity shunting of the high frequency currents to be measured are substantially avoided.

While I have described my invention in connection with an electrical measuring device, it should be understood that it is equally applicable to other sealed devices such, for example, as vacuum tubes or gas-filled discharge devices. Furthermore, the particular structures which I have illustrated may be considerably modified by those skilled in the art without departing from the invention, and I aim in the appended claims to cover all such equivalent modifications as come within the true spirit and scope of the foregoing disclosure.

What I claim as new and desire to secure by Letters Patent of the United States is:

1. An electrical device comprising a pair of opposed metal wall members, a ceramic member interposed directly between said wall members for spacing them apart, said ceramic member having a central opening therethrough, a plurality of energy-converting elements arranged in cooperative relation in the space provided by said opening, lead-in conductors supported by said spacing member and projecting outwardly from between said wall members, said conductors terminating inwardly within said enclosed space and connecting with said energy-converting elements, and a quantity of thermoplastic material applied to the outer periphery of said spacing member and sealed to said wall members and to said conductors.

2. An electrical device comprising a pair of substantially circular metal wall members positioned in opposed relationship, an annular ceramic member directly interposed between said wall members and forming therewith an enclosed space which is jointly bounded by the inner surface of the ceramic member and of the wall members, energy-converting means within said enclosed space, lead-in conductors embedded in the wall of said ceramic member and extending outwardly from between said wall members, said conductors terminating inwardly within said enclosed space and connecting with said energy-converting means, and a narrow fillet of glass disposed around the outer periphery of said ceramic member and sealed to said wall members and to said conductors.

3. A vacuum device for measuring alternating current of high frequencies comprising a pair of opposed metal wall members, an annular ceramic disk directly interposed between said wall members and forming therewith an enclosed space which is bounded by the inner surfaces of the annular disk and of the wall members, a heating element positioned in the said space within the confines of the annular disk, a thermocouple also in said space and in heat responsive relation to said heating element, conductors embedded in said disk and connecting with said heating element for conducting the current to be measured thereto, said conductors being in rectilinear alinement and extending outwardly from between said metal wall members, additional conductors connecting with said thermocouple and extending outwardlly from between said wall members, and a narrow fillet of glass disposed around the outer periphery of said disk and sealed to said wall members and to all of said conductors.

4. The method of fabricating a sealed electrical device comprising enclosed energy-converting elements and lead-in conductors connecting with the same, which method includes supporting said elements and conductors in an annular insulating member having radially extending holes therein to permit the conductors to project outwardly therethrough and a central opening to receive the energy-converting elements, positioning wall members on opposite sides of the insulating member to enclose the space within said central opening, positioning thermoplastic material peripherally of said annular member, and heating said thermoplastic material sufficiently to permit the material to be drawn into sealing relation with said conductors and said wall members.

5. The method of fabricating a sealed electrical device comprising enclosed energy-converting elements and lead-in conductors connecting with the same, which method includes supporting said elements and conductors in a substantially annular insulating member having radially extending holes therein to permit the conductors to project outwardly therethrough and a central opening to receive the energy-converting elements, positioning metal wall members on opposite sides of the insulating member to enclose the space within said central opening, providing a pair of preformed closed rings of thermoplastic material extending around the outer periphery of said annular member and on opposite sides of said outwardly projecting conductors, applying suction to the enclosed space and simultaneously heating said thermoplastic material to cause the material to be drawn into sealing relation with said conductors and said wall members.

SYDNEY S. STACK.